US010051249B2

United States Patent
Ogi et al.

(10) Patent No.: US 10,051,249 B2
(45) Date of Patent: Aug. 14, 2018

(54) LASER PROJECTION DISPLAY DEVICE, AND METHOD FOR CONTROLLING LASER LIGHTSOURCE DRIVING UNIT USED FOR SAME

(71) Applicant: Hitachi-LG Data Storage, Inc., Tokyo (JP)

(72) Inventors: Yuya Ogi, Tokyo (JP); Yoshiho Seo, Tokyo (JP); Tomoyuki Nonaka, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 15/543,583

(22) PCT Filed: Jan. 5, 2016

(86) PCT No.: PCT/JP2016/050117
§ 371 (c)(1),
(2) Date: Jul. 14, 2017

(87) PCT Pub. No.: WO2016/121414
PCT Pub. Date: Aug. 4, 2016

(65) Prior Publication Data
US 2018/0013994 A1 Jan. 11, 2018

(30) Foreign Application Priority Data
Jan. 30, 2015 (JP) .................................. 2015-017639

(51) Int. Cl.
*H04N 9/31* (2006.01)
(52) U.S. Cl.
CPC ......... *H04N 9/3182* (2013.01); *H04N 9/3108* (2013.01); *H04N 9/3129* (2013.01);
(Continued)

(58) Field of Classification Search
CPC .. H04N 9/3182; H04N 9/3108; H04N 9/3129; H04N 9/3155; H04N 9/3161; H04N 9/3194; H04N 5/58; G09G 2380/10
See application file for complete search history.

(56) References Cited

U.S. PATENT DOCUMENTS

| 5,339,118 A | 8/1994 | Tagami |
| 8,348,436 B2 * | 1/2013 | Ikegami .................. G09G 3/02 313/307 |

(Continued)

FOREIGN PATENT DOCUMENTS

| JP | 05-224166 A | 9/1993 |
| JP | 2006-343397 A | 12/2006 |

(Continued)

OTHER PUBLICATIONS

International Search Report of PCT/JP2016/050117 dated Mar. 29, 2016.

*Primary Examiner* — Brian Yenke
(74) *Attorney, Agent, or Firm* — Mattingly & Malur, PC

(57) ABSTRACT

The laser projection display device includes: a photo-sensor for detecting the quantity of laser light generated by the laser light source; and an image processing unit for processing a drive signal on the basis of the quantity of light of the detected laser light and supplying the processed drive signal to a driving unit for the laser light source. Right after the dimming, the image processing unit supplies the drive signal to the driving unit for the laser light source on the basis of the quantity of light of the detected laser light within a second execution cycle shorter than a first execution cycle which is the execution cycle used during the normal operation.

19 Claims, 9 Drawing Sheets

(52) U.S. Cl.
CPC ......... H04N 9/3155 (2013.01); H04N 9/3161 (2013.01); H04N 9/3194 (2013.01)

(56) References Cited

U.S. PATENT DOCUMENTS

| | | | | |
|---|---|---|---|---|
| 8,736,191 B2* | 5/2014 | Barrow | ............. | H05B 33/0815 315/279 |
| 8,801,193 B2* | 8/2014 | Chihara | ............. | H04N 9/3164 353/85 |
| 8,847,972 B2* | 9/2014 | Kane | ............. | G01J 1/42 345/589 |
| 8,890,797 B2* | 11/2014 | Gondo | ............. | G09G 3/3406 345/102 |
| 8,928,578 B2* | 1/2015 | Schroder | ............. | G06F 3/04812 345/156 |
| 9,215,775 B1* | 12/2015 | Lunn | ............. | H05B 33/0854 |
| 9,218,786 B2* | 12/2015 | Haruna | ............. | G09G 5/10 |
| 9,245,482 B2* | 1/2016 | Ishii | ............. | G03B 21/2013 |
| 9,310,670 B2* | 4/2016 | Naitou | ............. | G03B 21/2053 |
| 9,347,828 B1* | 5/2016 | Zhao | ............. | G01J 1/4204 |
| 9,483,999 B2* | 11/2016 | Ogi | ............. | G09G 5/02 |
| 9,494,847 B2* | 11/2016 | Katahira | ............. | G09G 5/02 |
| 9,530,342 B2* | 12/2016 | Bell | ............. | G09G 3/2003 |
| 9,736,443 B2* | 8/2017 | Zhang | ............. | G09G 3/3406 |
| 9,761,163 B2* | 9/2017 | Ohyama | ............. | G09G 3/025 |
| 9,891,426 B2* | 2/2018 | Yamakawa | ............. | G02B 26/02 |
| 2001/0008394 A1* | 7/2001 | Kanamori | ............. | G02B 27/01 345/7 |
| 2006/0007223 A1* | 1/2006 | Parker | ............. | G01J 1/4204 345/207 |
| 2007/0216616 A1* | 9/2007 | Stessen | ............. | G09G 3/3413 345/84 |
| 2009/0096779 A1* | 4/2009 | Ikegami | ............. | G09G 3/02 345/214 |
| 2009/0219244 A1* | 9/2009 | Fletcher | ............. | G09G 3/3406 345/102 |
| 2009/0224136 A1* | 9/2009 | Ikegami | ............. | G01J 1/32 250/205 |
| 2009/0278828 A1* | 11/2009 | Fletcher | ............. | G06F 1/3203 345/207 |
| 2010/0002197 A1* | 1/2010 | Kaneko | ............. | G03B 21/005 353/31 |
| 2010/0066657 A1* | 3/2010 | Park | ............. | G09G 3/342 345/94 |
| 2010/0103172 A1* | 4/2010 | Purdy, Sr. | ............. | G06T 15/50 345/426 |
| 2010/0302515 A1* | 12/2010 | Plut | ............. | H04N 9/3155 353/85 |
| 2011/0050663 A1* | 3/2011 | Katahira | ............. | G09G 5/02 345/207 |
| 2012/0169777 A1* | 7/2012 | Budni | ............. | G09G 3/02 345/690 |
| 2012/0288156 A1* | 11/2012 | Kido | ............. | H04N 9/73 382/104 |
| 2013/0207950 A1* | 8/2013 | Haruna | ............. | H04N 9/3135 345/207 |
| 2013/0241971 A1* | 9/2013 | Sekiya | ............. | G02B 26/101 345/690 |
| 2014/0049757 A1* | 2/2014 | Naitou | ............. | G03B 21/2053 353/86 |
| 2014/0192093 A1 | 7/2014 | Haruna et al. | | |
| 2014/0253527 A1* | 9/2014 | Ogi | ............. | G09G 5/02 345/207 |
| 2014/0285536 A1* | 9/2014 | Haruna | ............. | G09G 5/10 345/690 |
| 2015/0161926 A1* | 6/2015 | Ogi | ............. | H04N 9/3129 345/207 |
| 2015/0260984 A1* | 9/2015 | Yamakawa | ............. | H04N 9/3129 345/591 |
| 2017/0118452 A1* | 4/2017 | Ogi | ............. | G02B 26/0833 |
| 2017/0280115 A1* | 9/2017 | Hatagi | ............. | G02B 26/0833 |
| 2017/0280117 A1* | 9/2017 | Ogi | ............. | H04N 9/3135 |
| 2017/0318254 A1* | 11/2017 | Tanaka | ............. | H04N 5/58 |

FOREIGN PATENT DOCUMENTS

| | | |
|---|---|---|
| JP | 2007-050757 A | 3/2007 |
| JP | 2010-237238 A | 10/2010 |
| JP | 2012-108397 A | 6/2012 |
| JP | 2014-063063 A | 4/2014 |
| JP | 2014-132295 A | 7/2014 |
| JP | 2014-174292 A | 9/2014 |
| WO | 2014/045751 A1 | 3/2014 |

* cited by examiner

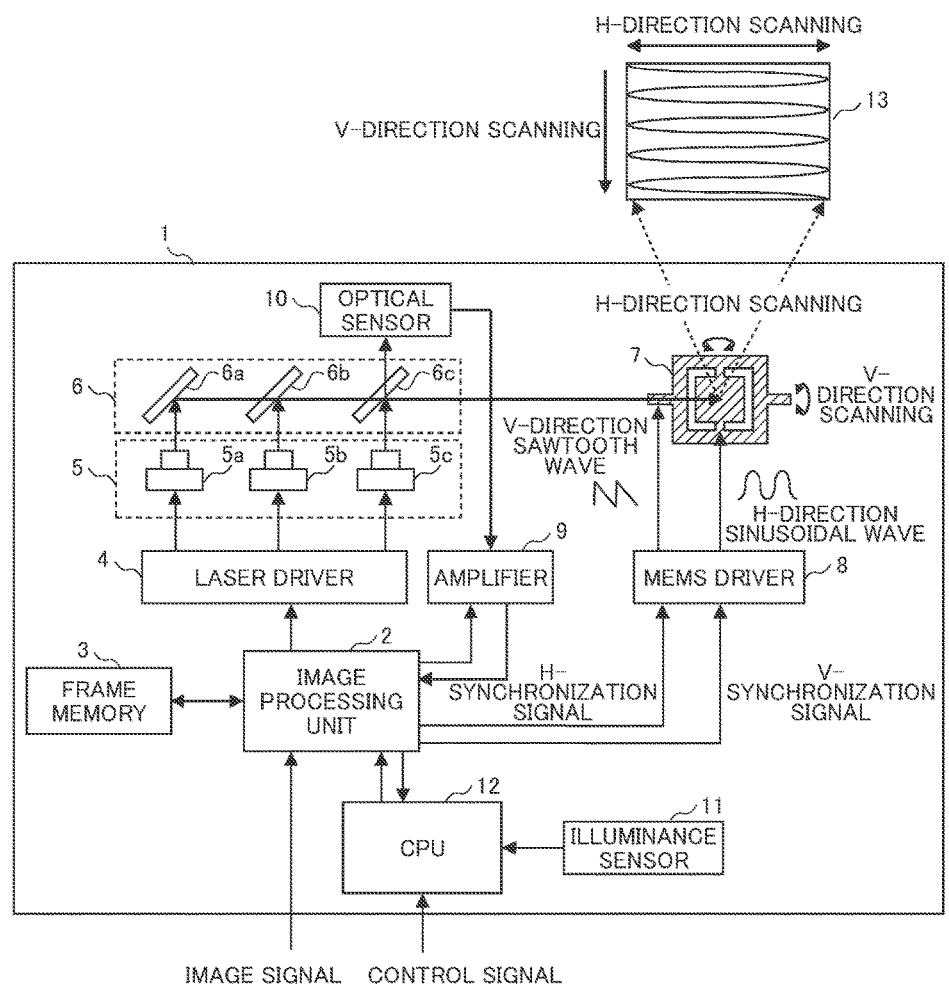
F I G. 1

F I G. 2
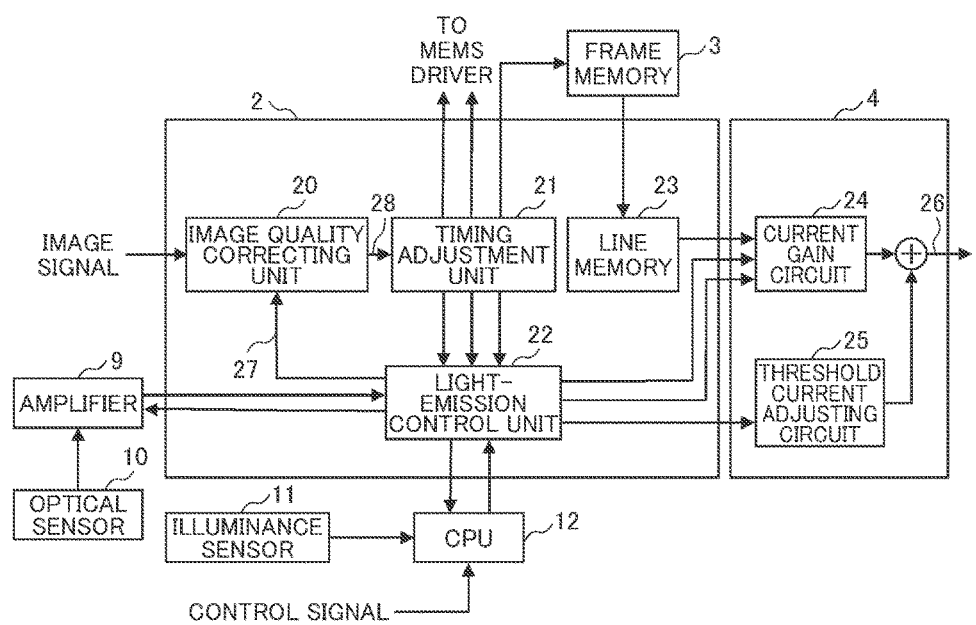

| MAXIMUM AMOUNT OF LIGHT | LUT | THRESHOLD CURRENT (mA) | CURRENT GAIN (mA/IMAGE SIGNAL VALUE) |
|---|---|---|---|
| Lm | LUT1 | 60.0 | 140/255 |
| Lm/2 | LUT2 | 60.0 | 70/255 |
| Lm/4 | LUT3 | 60.0 | 35/255 |
| ⋮ | | ⋮ | ⋮ |
| Lm/2048 | LUTN | 60.0 | 0.07/255 |

F I G. 7
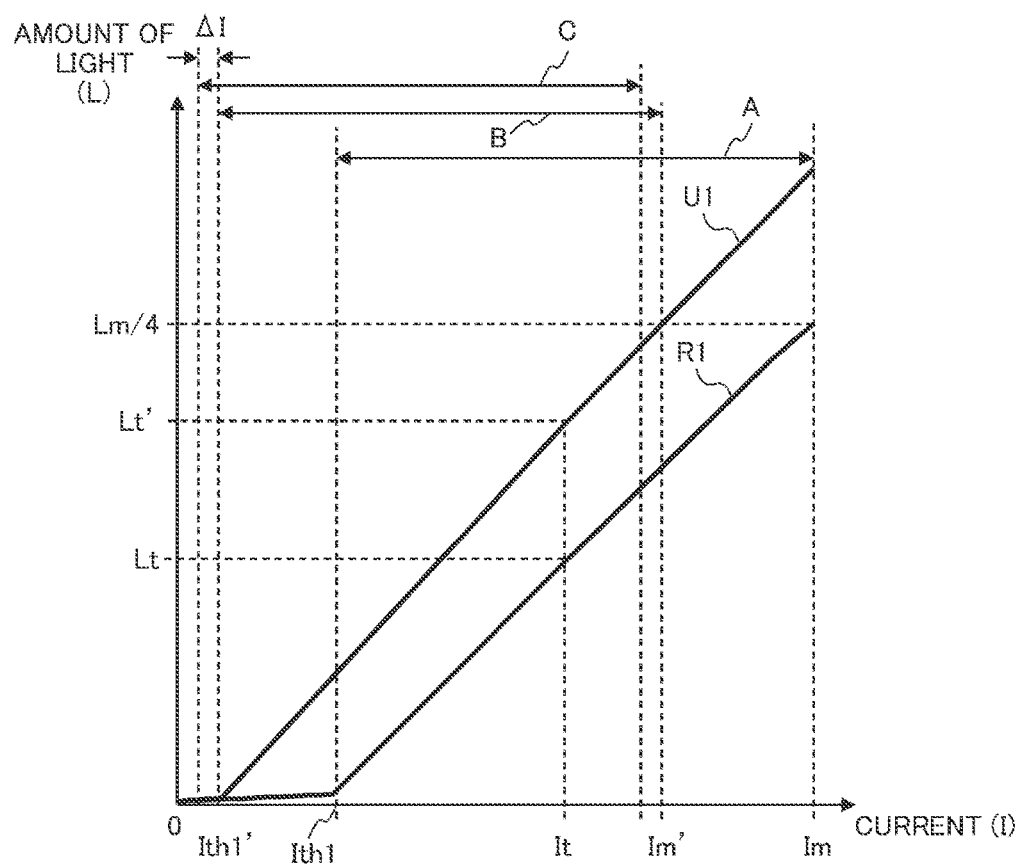

LASER PROJECTION DISPLAY DEVICE, AND METHOD FOR CONTROLLING LASER LIGHTSOURCE DRIVING UNIT USED FOR SAME

TECHNICAL FIELD

The present invention relates to a laser projection display device that performs video display by performing scanning of light of a light source such as a semiconductor laser with a two-dimensional scanning mirror such as a micro electro mechanical system (MEMS) mirror.

BACKGROUND ART

Recently, a small-sized projection projector using the MEMS and the semiconductor laser light source has been spreading. Examples of the background art of this technical field includes JP 2006-343397 A (Patent Document 1) and JP H5-224166 A (Patent Document 2). Patent Document 1 and Patent Document 2 disclose a projector that performs scanning in horizontal and vertical directions with biaxial MEMS mirror or scanner and modulates a laser light source to project an image. In the small-sized projection projector using a semiconductor laser as described above, amount of light-forward current characteristics of the semiconductor laser, which is used, vary due to a temperature. Therefore, there is known a problem that white balance of a display screen varies.

In addition, Patent Document 2 discloses a grayscale correcting device that performs optical modulation with an optical modulator by extrapolating a test signal during a flyback period that is a non-video display period, stores actual grayscale characteristics calculated by a microprocessor and ideal characteristics in a storage device through feedback, and automatically performs grayscale correction during a normal operation.

CITATION LIST

Patent Document

Patent Document 1: JP 2006-343397 A
Patent Document 2: JP H5-224166 A

SUMMARY OF THE INVENTION

Problems to be Solved by the Invention

However, in the technology that is described in Patent Document 2, there is no consideration for a dimming operation of changing brightness of a display image, that is, optical intensity. That is, there is no consideration for a control corresponding to a variation in amount of light-forward current characteristics of the semiconductor laser immediately after dimming processing, and thus there is a problem that white balance varies due to the dimming operation.

The invention has been made in consideration of the above-described problem, and an object thereof is to provide a laser projection display device in which a white balance variation of a display image is reduced in the dimming operation.

Solutions to Problems

To solve the above-described problem, for example, a configuration described in the appended claims is employed.

The invention includes a plurality of kinds of means for solving the above-described problem. According to an example of the means, there is provided a laser projection display device that projects laser light beams of a plurality of colors corresponding to image signals and displays an image corresponding to the image signals. The laser projection display device includes: a laser light source that generates the laser light beams of the plurality of colors; a laser light source driving unit that drives the laser light source; an optical sensor that detects the amount of light of the laser light beams which are generated by the laser light source; and an image processing unit that processes the image signals on the basis of the amount of light detected by the optical sensor, and supplies a drive signal to the laser light source driving unit. The image processing unit performs a process of determining the drive signal in a first execution cycle and a second execution cycle that is shorter than the first execution cycle with respect to the laser light source driving unit.

Effects of the Invention

According to the invention, it is possible to provide a laser projection display device in which white balance variation of a display image due to a dimming operation is reduced.

BRIEF DESCRIPTION OF THE DRAWINGS

FIG. 1 is a block diagram illustrating a basic configuration of a laser projection display device in Example 1.

FIG. 2 is a block diagram illustrating a signal processing unit in Example 1.

FIG. 7 is a characteristic view illustrating an example of the amount of light-forward current characteristics of the semiconductor laser for description of the dimming processing in Example 1.

MODE FOR CARRYING OUT THE INVENTION

Figure 3:
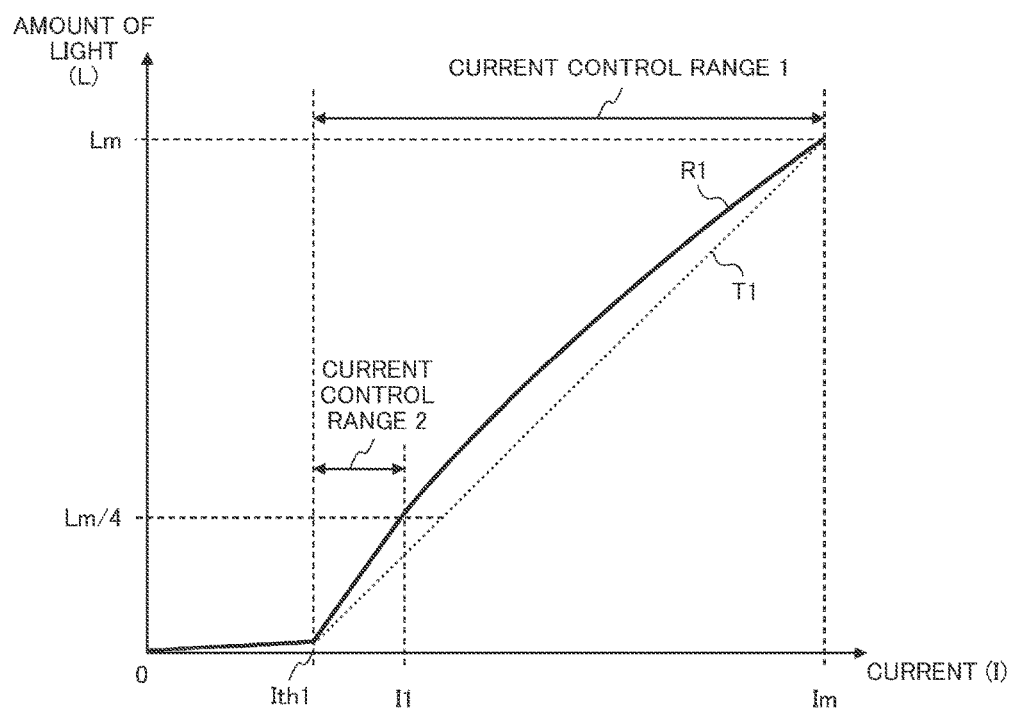
FIG. 3 is a characteristic view illustrating an example of amount of light-forward current characteristics of a semiconductor laser in Example 1.

Hereinafter, Examples of the invention will be described in detail with reference to the accompanying drawings.

Example 1

FIG. 1 is a block diagram illustrating a basic configuration of a laser projection display device in this example. In FIG. 1, a laser projection display device 1 includes an image processing unit 2, a frame memory 3, a laser driver 4, a laser light source 5, a reflective mirror 6, an MEMS scanning mirror 7, an MEMS driver 8, an amplifier 9, an optical sensor 10, an illuminance sensor 11, and a central processing unit (CPU) 12, and displays a display image 13.

The image processing unit 2 generates an image signal in which various kinds of correction is applied to an image signal that is input from an outer side, generates a horizontal (hereinafter, also referred to as "H") synchronization signal and a vertical (hereinafter, also referred to as "V") synchronization signal which are synchronous with the image signal, and supplies the synchronization signal to the MEMS driver 8. Furthermore, the image processing unit 2 controls the laser driver (hereinafter, also referred to as "laser light source driving unit") (4) in correspondence with information acquired from the CPU 12, and performs laser output adjustment for making white balance constant.

Here, the above-described various kinds of correction represent that correction of image deformation due to scanning with the MEMS scanning mirror 7, image grayscale adjustment by a LOOK UP TABLE (hereinafter, also referred to as "LUT"), and the like are performed. Furthermore, the image deformation occurs due to a difference in a relative angle between the laser projection display device 1 and a projection surface, an optical axis deviation of the laser light source 5 and the MEMS scanning mirror 7, and the like. Details of the LUT will be described later.

The laser driver 4 receives a drive signal and an image signal which are output from the image processing unit 2, and modulates the laser light source 5 in correspondence with the drive signal and the image signal. For example, the laser light source 5 includes three semiconductor lasers (5a, 5b, and 5c) for RGB, and emits RGB laser light beams corresponding to the image signal for each of RGB of the image signal.

The three RGB light beams are synthesized by the reflective mirror 6 including three mirrors, and are emitted to the MEMS scanning mirror 7. As the reflective mirror 6, a special optical element, which reflects a light beam of a specific wavelength and allows light beams of other wavelengths to be transmitted therethrough, is used. The optical element is typically called a dichroic mirror.

Specifically, the reflective mirror 6 includes a dichroic mirror 6a that reflects a laser light beam (for example, an R light beam) emitted from the semiconductor laser 5a and allows laser light beams of other colors to be transmitted therethrough, a dichroic mirror 6b that reflects a laser light beam (for example, a G light beam) emitted from the semiconductor laser 5b and allows laser light beams of other colors to be transmitted therethrough, and a dichroic mirror 6c that reflects a laser light beam (for example, a B light beam) emitted from the semiconductor laser 5c and allows laser light beams of other color to be transmitted therethrough. The reflective mirror 6 synthesized the laser light beams of the R light beam, the G light beam, and the B light beam into one laser light beam and supplies the resultant laser light beam to the MEMS scanning mirror 7.

The MEMS scanning mirror 7 is an image scanning unit including a biaxial rotary mechanism, and can allow a central mirror portion to vibrate in two directions including a horizontal direction and a vertical direction. A vibration control for the MEMS scanning mirror 7 is performed by the MEMS driver 8. The MEMS driver 8 generates a sinusoidal wave in synchronization with a horizontal synchronization signal transmitted from the image processing unit 2 and a sawtooth wave in synchronization with a vertical synchronization signal transmitted from the image processing unit 2 to drive the MEMS scanning mirror 7.

The MEMS scanning mirror 7 receives a sinusoidal wave drive signal transmitted from the MEMS driver 8, and performs a sinusoidal wave oscillation motion in a horizontal direction. In addition, the MEMS scanning mirror 7 receives a sawtooth wave transmitted from the MEMS driver 8, and performs a uniform motion in one direction of a vertical direction. According to this, scanning of a laser light beam is performed in a trajectory similar to the display image 13 in FIG. 1. When the scanning becomes synchronous with a modulation operation by the laser driver 4, an input image is optically projected.

The optical sensor 10 measures the amount of light of the laser light beam that is projected, and outputs the amount of light to the amplifier 9. The amplifier 9 amplifies the resultant output of the optical sensor 10 in accordance with an amplification rate set by the image processing unit 2, and outputs the resultant amplified output to the image processing unit 2. In FIG. 1, the optical sensor 10 is disposed to detect a leaked light beam of the RGB laser light beams which are synthesized by the reflective mirror 6. That is, the optical sensor 10 is disposed on a side opposite to the semiconductor laser 5c with the reflective mirror 6c interposed therebetween. The reflective mirror 6c has characteristics of allowing the laser light beams transmitted from the semiconductor lasers 5a and 5b to be transmitted therethrough, and reflects the laser light beam transmitted from the semiconductor laser 5c. However, it is difficult to realize characteristics of total transmission or total reflection. Accordingly, typically, several percentages of the laser light beams (the light beams of the semiconductor lasers 5a and 5b) are reflected, or several percentages of the laser light beams (the light beams of the semiconductor laser 5c) are transmitted. Accordingly, when the optical sensor 10 is disposed at the position in FIG. 1, the reflective mirror 6c can allow several percentages of the laser light beam transmitted from semiconductor laser 5c to be transmitted therethrough, and can reflect several percentages of the laser light beams transmitted from the semiconductor lasers 5a and 5b for incidence to the optical sensor 10.

In addition, the illuminance sensor 11 detects illuminance at the periphery of the laser projection display device 1 and outputs the illuminance to the CPU 12. For example, the CPU 12 receives a signal transmitted from the illuminance sensor 11 or a control signal corresponding to an instruction of a user from an outer side, and supplies a dimming request signal for controlling brightness of the display image 13, which is generated by the image processing unit 2, to the image processing unit 2. Furthermore, the dimming is a function of adjusting brightness. For example, in this example, the dimming is an operation for transition from luminance in a normal operation to luminance different from the luminance in the normal operation. Here, in a case where the CPU 12 transmits the dimming request signal on the basis of a signal transmitted from the illuminance sensor 11, it is preferable to have a hysteresis. For example, when an output of the illuminance sensor 11 is set to 0 to 100, 0 to 20 are set to Brightness 1, 21 to 40 are set to Brightness 2, 41 to 60 are set to Brightness 3, 61 to 80 are set to Brightness 4, 81 to 100 are set to Brightness 5, even when the output of the illuminance sensor 11 varies from 30 by approximately ±2, brightness does not vary. However, when the output of the illuminance sensor 11 varies from 20 by approximately ±2, Brightness 1 and Brightness 2 transition a plurality of times, and thus it is not preferable for a user. Here, for example, when the hysteresis is set in such a manner that in Brightness 2, the output of the illuminance sensor 11 is set to 10 or less as a condition of transition into Brightness 1, and the output of the illuminance sensor 11 is set to 50 or greater as a conditions of transition into Brightness 3, it is possible to prevent the transition from occurring a plurality of times between different kinds of brightness. Furthermore, in the description, only the output of the illuminance sensor 11 is described, but it is not needless to say that a temporal hysteresis can be used.

Here, description will be given of a configuration of the signal processing unit in this example with reference to FIG. 2. FIG. 2 is a block diagram illustrating the signal processing unit in this example, and illustrates details of an inner configuration of the image processing unit 2 and the laser driver 4 in FIG. 1. In FIG. 2, an image signal, which is input from an outer side of the image processing unit 2, is input to an image quality correcting unit 20.

The image quality correcting unit 20 performs correction of image deformation caused by scanning with the MEMS scanning mirror 7, or image grayscale adjustment in accordance with the LUT. In the image grayscale adjustment, which is performed in the image quality correcting unit 20, in accordance with the LUT, image adjustment is performed with respect to an image signal that is input from an outer side on the basis of an LUT selection signal 27 transmitted from the light-emission control unit 22, and an image signal 28 after correction is transmitted to a timing adjusting unit 21.

The timing adjusting unit 21 generates a horizontal synchronization signal and a vertical synchronization signal from the image signal 28 after correction which is input from the image quality correcting unit 20, and transmits the signals to the MEMS driver 8 and light-emission control unit 22. In addition, the image signal is temporarily stored in the frame memory 3. The image signal that is written in the frame memory 3 is read out as read-out signal that is synchronous with the horizontal synchronization signal and the vertical synchronization signal which are generated in the timing adjusting unit 21. In addition, the image signal in the frame memory 3 is read out in a state of being delayed from the input image signal by one frame.

The light-emission control unit 22 performs adjustment of an amplication rate in the amplifier 9, and current setting with respect to a current gain circuit 24 and a threshold current adjusting circuit 25 as a drive signal of the laser driver 4 so as to determine a current that is allowed to flow to LD. In addition, the light-emission control unit 22 has a role of transmitting a reference image signal value for monitoring light-emission intensity to the current gain circuit 24 for an auto power control (APC) that is processing of making light-emission intensity of the semiconductor laser temporarily constant. Detailed operations of the light-emission control unit 22 and the APC will be described later.

The read-out image signal is input to a line memory 23. The line memory 23 fetches an image signal of one horizontal period and sequentially reads out an image signal in the subsequent horizontal periods. The reason why the line memory 23 temporarily relays the image signal is as follows. Typically, a read-out clock frequency of the frame memory 3 and a clock frequency when transmitting an image signal to the laser driver 4 may be different from each other. According to this, after the image signal of one horizontal period is temporarily fetched with the line memory 23 at the read-out clock frequency of the frame memory 3, a process of reading out the image signal from the line memory 23 at the transmission clock frequency of the image signal. When the read-out clock frequency of the frame memory 3 and the transmission clock frequency of the image signal match each other, the line memory 23 is not necessary. The image signal that is read-out from the line memory 23 is supplied to the laser driver 4.

Next, description will be given of the current gain circuit 24 and the threshold current adjusting circuit 25 in the laser driver 4. As to be described later in detail, the threshold current adjusting circuit 25 adjusts a threshold current that determines a lower limit, at which the semiconductor lasers 5a to 5c emit light, in correspondence with a threshold current value that is set by the light-emission control unit 22. In other words, the threshold current adjusting circuit 25 generates an off-set component of a current value that flows to the semiconductor lasers 5a to 5c. In addition, the current gain circuit 24 multiplies an image signal, which is input from the line memory 23, by a current gain for converting an image signal value into a current value to control a current value that flows to the laser light source 5. Furthermore, the current gain is obtained by the light-emission control unit 22 and is set to the current gain circuit 24. That is, when the current gain increases or decreases, a current value corresponding to the image signal increases or decreases. Accordingly, the current value 26, which actually flows to the semiconductor lasers 5a to 5c, becomes the sum of a threshold current value that is set by the threshold current adjusting circuit 25, a current gain that is set by the current gain circuit 24, and a signal current value corresponding to the image signal.

The above-described operation is a basic operation of the image processing unit 2. Next, description will be given of processing contents of dimming processing of changing the amount of light of the display image with reference to FIG. 3 and FIG. 4.

FIG. 3 is a characteristic view illustrating an example of amount of light-forward current characteristics of a semiconductor laser. As illustrated in FIG. 3, the semiconductor laser has characteristics in which the amount of light rapidly increases with a predetermined threshold current Ith1 set as a boundary. In addition, a variation amount of the amount of light with respect to a current is not constant, and shows non-linear characteristics indicated by R1. Here, it is preferable that a current control range, which is used to form a bright image, is a range from the threshold current Ith1 to a current Im at which the amount of light Lm is obtained. That is, when an image signal is set to 8 bit (maximum: 255), the current gain circuit 24 and the threshold current adjusting circuit 25 are controlled in such a manner that a forward current becomes Ith1 in a case where the image signal is 0 or 1, and the maximum forward current when the image signal is 255 becomes Im. More specifically, the light-emission control unit 22 controls the threshold current adjusting circuit 25 so that a current value becomes Ith1, and sets a current gain of (Im−Ith1)/255 to the current gain circuit 24. In this manner, in a case where the image signal is 0, a current of Ith1 is allowed to flow to the laser, and in a case where the image signal is 255, a current of Im is allowed to flow to the semiconductor laser. That is, a current range, which flows to the semiconductor laser when forming a bright image, becomes Current Control Range 1 in FIG. 3. Furthermore, the following control may be performed. Specifically, in a case where the image signal is 0, the forward current may be set to 0 to turn off the laser so as to obtain contrast.

As described above, the variation amount of the amount of light with respect to the current of the semiconductor laser in Current Control Range 1 illustrated in FIG. 3 is not constant, and has non-linear characteristics indicated by R1. It is preferable that the amount of light has a predetermined variation amount with respect to a constant variation amount of an image so as to obtain the number of display grayscales of a display image. As means for allowing the amount of light to have a predetermined variation amount, a method of converting an input image signal by LUT to perform grayscale adjustment of the image can be exemplified. Description will be given of a case where the grayscale adjustment is performed so that the amount of light output linearly varies with respect to an input image signal for simplification. In this case, LUT with respect to the input image signal is set to LUT in which a characteristic of R1 is inversely converted into a target characteristic T1, the amount of light output with respect to the input image signal becomes linear. Furthermore, it is needless to say that the grayscale adjustment may be set so that the amount of light output linearly varies, and typical gamma characteristics are attained.

Next, description will be given of a dimming operation with reference to FIG. 3. For example, in a case where the laser projection display device is used as an in-vehicle display device, a bright image (maximum amount of light (Lm)) may be projected by using a large amount of light capable of being projected by the laser projection display device under a bright environment in the daytime. In this case, a control range of a current that drives the semiconductor laser may be Current Control Range 1 illustrated in FIG. 3. However, under a dark environment such as the inside of a tunnel in which the periphery of a vehicle is dark, when the image is projected with brightness having the above-described amount of light (Lm), a dazzling impression may be given to a driver. Therefore, it is necessary for the laser projection display device to be switched so as to project an image with brightness that is adjusted to an ambient environment of the vehicle. That is, it is necessary to perform a dimming operation of changing optical intensity of a display image of the laser projection display device in correspondence with the ambient environment.

As an example, consideration will be given of a case of changing a state in which a bright image (maximum amount of light Lm) is displayed in a normal operation to a state in which an image (maximum amount of light Lm/4) with ¼ brightness is displayed by the dimming operation, particularly, the current control range illustrated in FIG. 3. Furthermore, the normal operation represents a state in which a dimming request signal is not input, and is a state in which APC to be described later is performed.

In a case where the maximum amount of light is changed to Lm/4 by the dimming operation, when the current control range is set to the above-described state of Current Control Range 1, an image signal value corresponding to a current I1 to the current Im is not used, and thus it is possible to output an image in which the maximum amount of light is Lm/4. However, since it is difficult to use the image signal value corresponding to the current I1 to the current Im, the brightness of the display image 13 varies, but the number of grayscales of the display image decreases. As a result, the quality of the display image deteriorates.

So as to suppress the deterioration in the quality of the display image, it is necessary to change the current control range in a case where the maximum amount of light is Lm/4 from Current Control Range 1 to Current Control range 2 in FIG. 3. That is, the current gain circuit 24 and the threshold current adjusting circuit 25 are controlled in such a manner that a forward current becomes Ith1 in a case where the image signal is 0 or 1, and the maximum forward current when the image signal is 255 becomes I1. More specifically, the light-emission control unit 22 controls the threshold current adjusting circuit 25 so that a current value becomes Ith1, and sets a current gain of (I1−Ith1)/255 to the current gain circuit 24. In this manner, in a case where the image signal is 0, a current of Ith1 flows to the semiconductor laser, and in a case where the image signal is 255, a current of I1 flows to the semiconductor laser. Accordingly, it is possible to change the brightness of the display image without deteriorating the number of grayscales of the image signal.

As is obvious from FIG. 3, a shape of a table is different between LUT with respect to Current Control Range 1 and LUT with respect to Current Control Range 2, and thus the LUT for Current Control Range 2 is necessary separately from the LUT for Current Control Range 1. There is no particular problem relating to preparation of a plurality of LUTs in a current state in which advancement in a semiconductor is in progress. For example, the light-emission control unit 22 instantly switches the image quality correcting unit 20 so that in the case of outputting a bright image (maximum amount of light is Lm), Current Control Range 1 and LUT corresponding to Current Control Range 1 are used, and in the case of outputting an image with ¼ brightness (maximum amount of light is Lm/4), Current Control Range 2 and a separate LUT corresponding to Current Control Range 2 are used. Furthermore, in the example, description has been given of Current Control Range 1 in which the maximum amount of light becomes Lm, and Current Control Range 2 in which the maximum amount of light becomes Lm/4, but there is no limitation thereto. For example, as illustrated in FIG. 4, a plurality of maximum amounts of light, a plurality of LUTs, a plurality of amounts of threshold current which are set to the threshold current adjusting circuit 25, and a plurality of current gain values which are set to the current gain circuit 24 may be stored in a storage region (not illustrated), and the CPU 12 may perform switching in correspondence with the dimming request signal that is transmitted by the CPU 12.

However, typically, the amount of light-forward current characteristics of the semiconductor laser greatly vary when a temperature varies. Accordingly, even when the amounts of threshold current and the current gain values, which are stored in advance as illustrated in FIG. 4, are set to the threshold current adjusting circuit 25 and the current gain circuit 24 in the dimming operation, it cannot be said that the amount of light intended is always obtained. In addition, consideration may be given to a method in which the temperature of the semiconductor laser is measured, and the amounts of threshold current and the current gain values, which are stored in advance, are set after being converted by using a conversion coefficient in correspondence with the temperature. However, actually, it is difficult to measure a temperature of the semiconductor laser, particularly, a temperature of a chip portion of the semiconductor laser, which has an effect on the temperature characteristics, with accuracy.

Figures 4, 5:
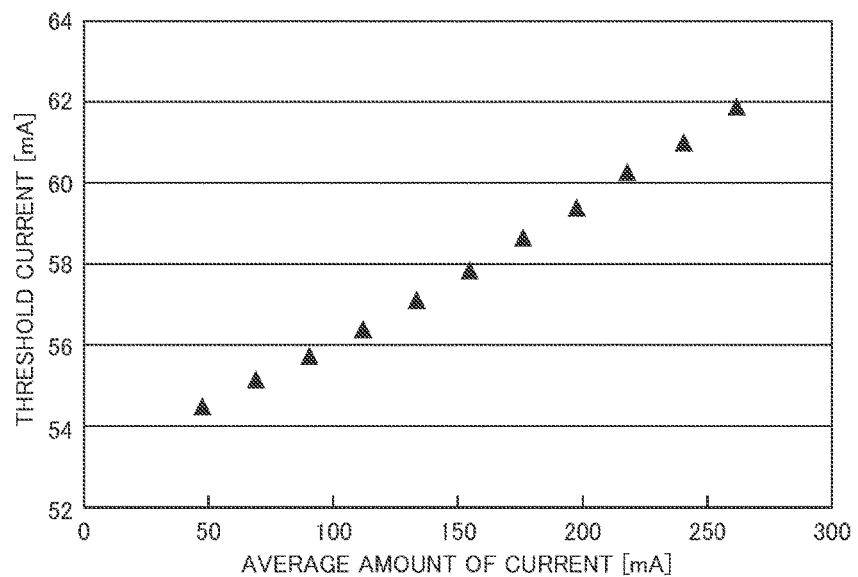
FIG. 4 is a table illustrating LUT, a threshold current, and a current gain in correspondence with maximum amount of light in Example 1.
FIG. 5 is a characteristic view illustrating a relationship between a threshold current and an average amount of current of a display image in a state in which a temperature in the vicinity of the semiconductor laser in Example 1 is set to be constant.

FIG. 5 illustrates a relationship between a threshold current and an average amount of current of the display image in a state in which a temperature in the vicinity of the semiconductor laser is set to be constant. Here, the average amount of current of the display image is a value obtained by dividing the sum of amounts of current of respective pixels in the display image by a total number of pixels, and will be described as an average current level (ACL). As can be seen from FIG. 5, even when the temperature in the vicinity of the semiconductor laser is constant, the threshold current varies due to the average amount of current of the display image, and thus the amount of light-forward current characteristics of the semiconductor laser vary. This is considered to be because even when the temperature in the vicinity of the semiconductor laser is constant, a temperature variation in the chip portion of the semiconductor laser in accordance with an increase in the amount of current that is out of control, has an effect on the semiconductor laser due to a small thermal capacity, and thus the threshold current varies. Accordingly, in other words, in the dimming operation of changing the amount of display light, it is necessary to consider not only the amount of light-forward current characteristics of the semiconductor laser when executing the dimming operation, but also a variation amount of ACL of the display image.

Therefore, in this example, consideration is given to the amount of light-forward current characteristics of the semiconductor laser and the variation amount of the ACL of the display image in the dimming operation. According to this, it is possible to reduce a white balance variation of the display image due to the dimming operation. Hereinafter, description will be given of a specific operation example with focus given to the operation of the light-emission control unit 22.

Figure 6:
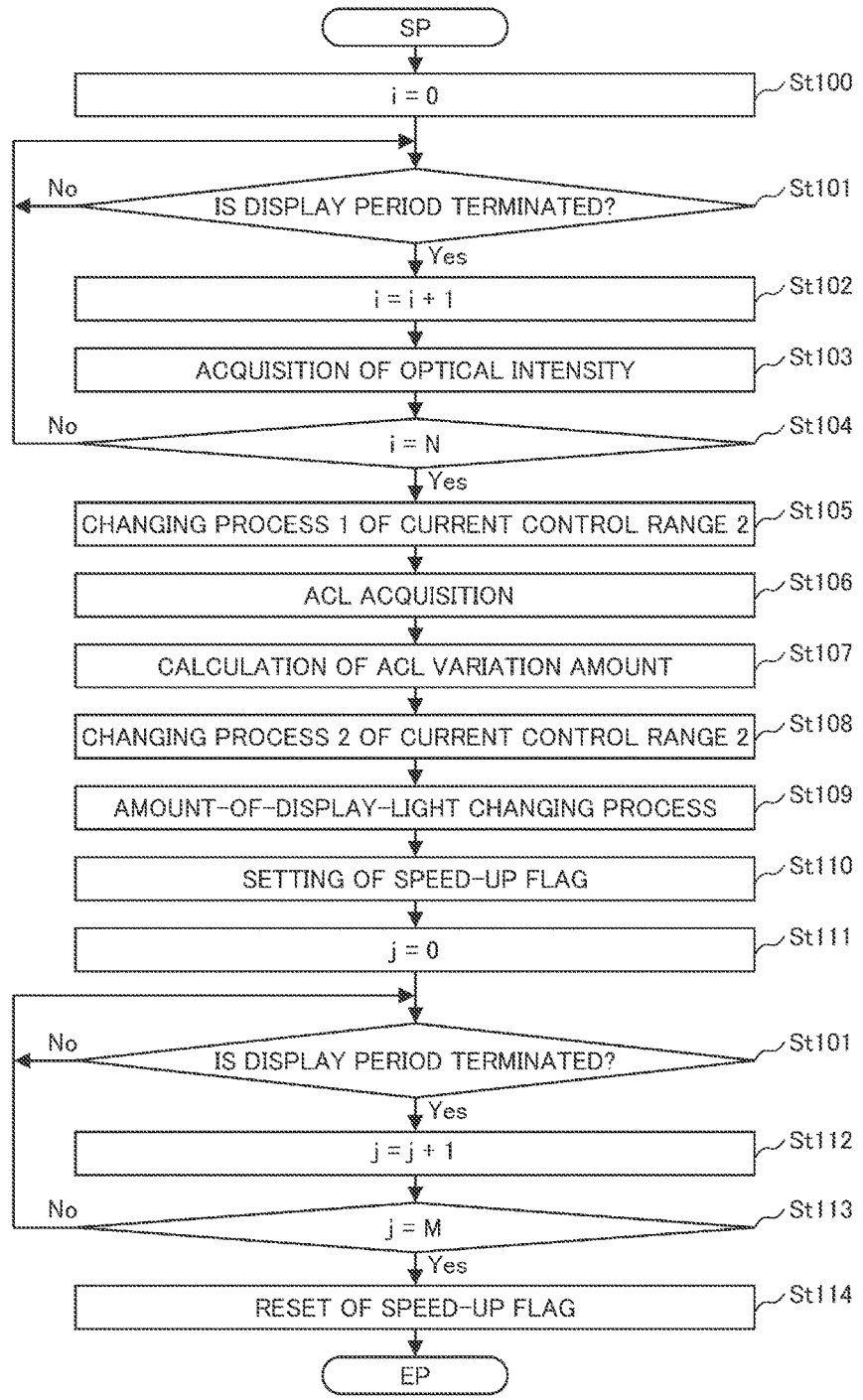
FIG. 6 is a flowchart illustrating dimming processing in Example 1.

FIG. 6 is a flowchart illustrating the dimming processing of this example. FIG. 6 illustrates a flowchart in a case where a current control range of the display image before initiation of the dimming processing is set to Current Control Range 1, and a dimming request signal of changing the current control range to Current Control Range 2 in which the maximum amount of light is Lm/4 is input.

In FIG. 6, after receiving the dimming request signal, the light-emission control unit 22 resets a variable i (St100). The variable i operates a frame number counter, and operates as a counter that controls the number of times of performing acquisition of optical intensity for the dimming operation. After resetting the variable i, it is determined whether or not a display period is terminated on the basis of a vertical synchronization signal transmitted from the timing adjusting unit 21 (St101). After the display period is terminated and enters flyback time, the light-emission control unit 22 increments the variable i (St102). Then, optical intensity of the semiconductor laser is acquired to change Current Control Range 2 in order for the maximum amount of light to be Lm/4 (St103). The acquisition of the optical intensity of the laser is performed in the flyback time except for the display period so that the acquisition does not have an effect on the display image.

Here, description will be given of the acquisition of the optical intensity with reference to FIG. 7. FIG. 7 is an example of the amount of light-forward current characteristics of the semiconductor laser. R1 represents characteristics in FIG. 3, and U1 represents characteristics in a predetermined temperature state when receiving the dimming request signal. First, the light-emission control unit 22 sets the threshold current and the current gain value, which are stored in advance and are drive signals of the laser driver 4, as illustrated in FIG. 4 to the threshold current adjusting circuit 25 and the current gain circuit 24 (current range indicated by A in FIG. 7). Then, the light-emission control unit 22 applies at least one forward current value It corresponding to an arbitrary image signal to the semiconductor laser and acquires optical intensity Lt' of the semiconductor laser. In other words, when selecting a plurality of magnitudes of the forward current that is applied to the semiconductor laser, it is possible to acquire characteristics of U1 in the current range indicated by A in FIG. 7.

Returning to FIG. 6, after acquiring the optical intensity of the semiconductor laser in the flyback time, the variable i is compared with a predetermined number N of controls of the number of times of acquiring the optical intensity for the dimming operation (St104). In a case where the variable i is not the same as the predetermined number N, it transitions to St101. Furthermore, it is needless to say that the current control range is returned to Current Control Range 1 that is a current control range of the display image before initiation of the dimming processing for the display image when transitioning from St104 to St101. In a case where the variable i is the same as the predetermined number N, it transitions to Changing Process 1 of Current Control Range 2 (St105). In Changing Process 1 of Current Control Range 2, a threshold current and a current gain of the semiconductor laser are calculated on the basis of the optical intensity obtained in St103, and Current Control Range 2 is changed. More specifically, the threshold current Ith1' and the amount of current Im' at which the amount of light becomes Lm/4 are calculated from the amount of light-forward current characteristics of the semiconductor laser as U1 obtained in the current range indicated by A in FIG. 7 to determine that Current Control Range 2 becomes B in FIG. 7.

Subsequently, in St106, ACL of the display image is acquired. An ACL value can be calculated from setting values of a threshold current and a current gain of the display image after detecting an average picture level (APL) obtained by dividing the total of respective pixel levels of the display image by a total number of pixels. An ACL variation amount before and after the dimming processing is calculated by using the ACL of the display image (St107). The contents of the display image do not vary before and after the dimming processing. Accordingly, as is the case with the calculation of the ACL of the display image, an ACL value after the dimming processing is calculated by using the APL of the display image and Current Control Range 2 calculated in St105 to obtain the ACL variation amount before and after the dimming. After obtaining the ACL variation amount, it transitions to Changing Process 2 of Current Control Range 2 (St108).

In Changing Process 2 of Current Control Range 2, a relationship between a threshold current and an average amount of current of the display image as illustrated in FIG. 5 is stored in a storage region (not illustrated), and a variation of the threshold current in accordance with the ACL variation amount is calculated with reference to the storage region. Addition and subtraction of the variation of the threshold current is performed with respect to Current Control Range 2 obtained in St105 so as to update Current Control Range 2. For example, in FIG. 7, when the variation of the threshold current in accordance with the ACL variation amount is set as ΔI, Current Control Range 2 becomes Current Range C that shifts from Current Range B by ΔI. Then, an amount-of-display-light changing process of setting Current Control Range 2, which is determined, for the display image is performed (St109). In this configuration, it is possible to realize a laser projection display device in which a white balance variation of the display image is reduced before and after the dimming operation of changing brightness.

After setting Current Control Range 2 for the display image, a speed-up flag for speeding up a threshold current determining process in the normal operation is set (St110). Here, description will be given of the speeding up. The speeding up is an operation of shorting an execution cycle of APC process in the normal operation. The amount-of-display-light changing process (St109) is so-called feed forward control of changing a current control range from the relationship between the threshold current and the average amount of current of the display image which is stored in the storage region (not illustrated) in advance in correspondence with the ACL variation amount. Therefore, it is difficult to cope with the entirety of deterioration of an LD with the passage of time and individual unevenness of the LD, and it cannot be said that the amount of light always matches a target amount of light. Therefore, it is necessary to speed up the APC process in the normal operation which is a feedback control immediately after the dimming processing. When speeding up the APC process, the amount of light can quickly converge to the target amount of light. In addition, the temperature variation of the chip portion of the semiconductor laser varies immediately after the dimming processing with a time constant. When speeding up the APC process, it is also possible to cope with a variation in optical output characteristics due to the temperature variation. Furthermore, the threshold current determining process in the normal operation will be described later.

After setting the speed-up flag, the light-emission control unit 22 resets a variable j (St111). The variable j also operates as a frame number counter similar to the variable i and operates as a counter that controls a period in which the speed-up flag is effective. After resetting the variable j, it is determined whether or not a display period is terminated on the basis of a vertical synchronization signal transmitted from the timing adjusting unit 21 (St101). After the display period is terminated and it enters flyback time, the light-emission control unit 22 increments the variable j (St112). Then, the variable j is compared with a predetermined number M of determinations of the period in which the speed-up flag is effective (St113). In a case where the variable j is not the same as the predetermined number M, it transitions to St101. In a case where the variable j is the same as the predetermined number M, the speed-up flag is reset (St114), and then the dimming processing is terminated.

Next, description will be given of the APC in the normal operation. As described above, when the temperature of the semiconductor laser varies, the amount of light-forward current characteristics vary. Therefore, so as to make light-emission intensity of the semiconductor laser temporally constant, as illustrated in FIG. 2, it is necessary to perform the APC of detecting the laser light-emission intensity with the optical sensor 10, monitoring the laser light-emission intensity through the amplifier 9, and performing feedback to the current gain circuit 24 and the threshold current adjusting circuit 25 on the basis of the light-emission intensity that is obtained. Particularly, the APC is divided into a threshold current determining process and a current gain determining process. As an example of the current gain determining process, description will be given of a case where the maximum amount of light of the display image is Lm/4. A maximum image signal is transmitted from the light-emission control unit 22 to the current gain circuit 24 as an image signal, and optical intensity of the image signal is detected with the optical sensor 10. The optical intensity is acquired through the amplifier 9. The optical intensity that is acquired and a target amount of light Lm/4 in Current Control Range 2 are compared with each other to perform a feedback control of a gain that is set to the current gain circuit 24 so that the amount of output light at the time of inputting the maximum image signal becomes Lm/4.

In addition, in the threshold current determining process, so as to determine a setting value that is provided to the threshold current adjusting circuit 25, an image signal, which becomes the threshold current Ith1 or a current value in the vicinity of the threshold current Ith1, is transmitted to the current gain circuit 24 as an image signal, and optical intensity of the image signal is detected with the optical sensor 10 and is acquired through the amplifier 9. In this manner, a current value, which is set to the threshold current adjusting circuit 25, is feedback controlled so as to attain the amount of output light at the time of inputting the image signal that becomes the threshold current Ith1 or the current value in the vicinity of the threshold current Ith1.

In this configuration, the current control range does not temporally vary, but a value of the amount of output light with respect to the input image signal becomes constant, and it is possible to allow a user not to recognize a variation in characteristics due to a temperature of the semiconductor laser. Here, the amount of output light Lm/4 and the amount of output light at the time of inputting the image signal that becomes the threshold current Ith1 or the current value in the vicinity of the threshold current Ith1 are stored in the storage region (not illustrated). In addition, when values of the amounts of light which correspond to respective colors of RGB are retained, it is possible to make the white balance constant. Furthermore, for simple description, the optical intensity, which is detected with the optical sensor 10 and is acquired through the amplifier 9, is set as the maximum image signal and the image signal that becomes the threshold current Ith1 or the current value in the vicinity of the threshold current Ith1. However, it is needless to say that optical intensity in any predetermined image signal is detected with the optical sensor 10 and may be acquired through the amplifier 9 without limitation to the above-described configuration.

The APC in the normal operation, it is preferable to change the execution cycle of the threshold current determining process between immediately after the dimming processing and the other cases. In the dimming processing illustrated in FIG. 6, the threshold current value is changed in correspondence with the ACL variation amount of the display image, but this configuration relates to a feedforward control that uses the relationship between the threshold current and the average amount of the display image which is stored in the storage region in advance. Accordingly, when the execution cycle of the threshold current determining process, which is a feedback control, is made to be faster immediately after the dimming processing, it is possible to quickly correct a deviation from ideal characteristics due to the feedforward control. In addition, in cases other than immediately after the dimming processing, it is preferable to make the execution cycle in the threshold current determining process slow. When the execution cycle of the threshold current determining process is made to be slow, the number of acquired samples of the optical intensity increases, and thus a more accurate feedback control becomes possible. In addition, uncomfortable feeling due to a frequent variation in the current control range of the display image is not provided to a user.

Figure 8:
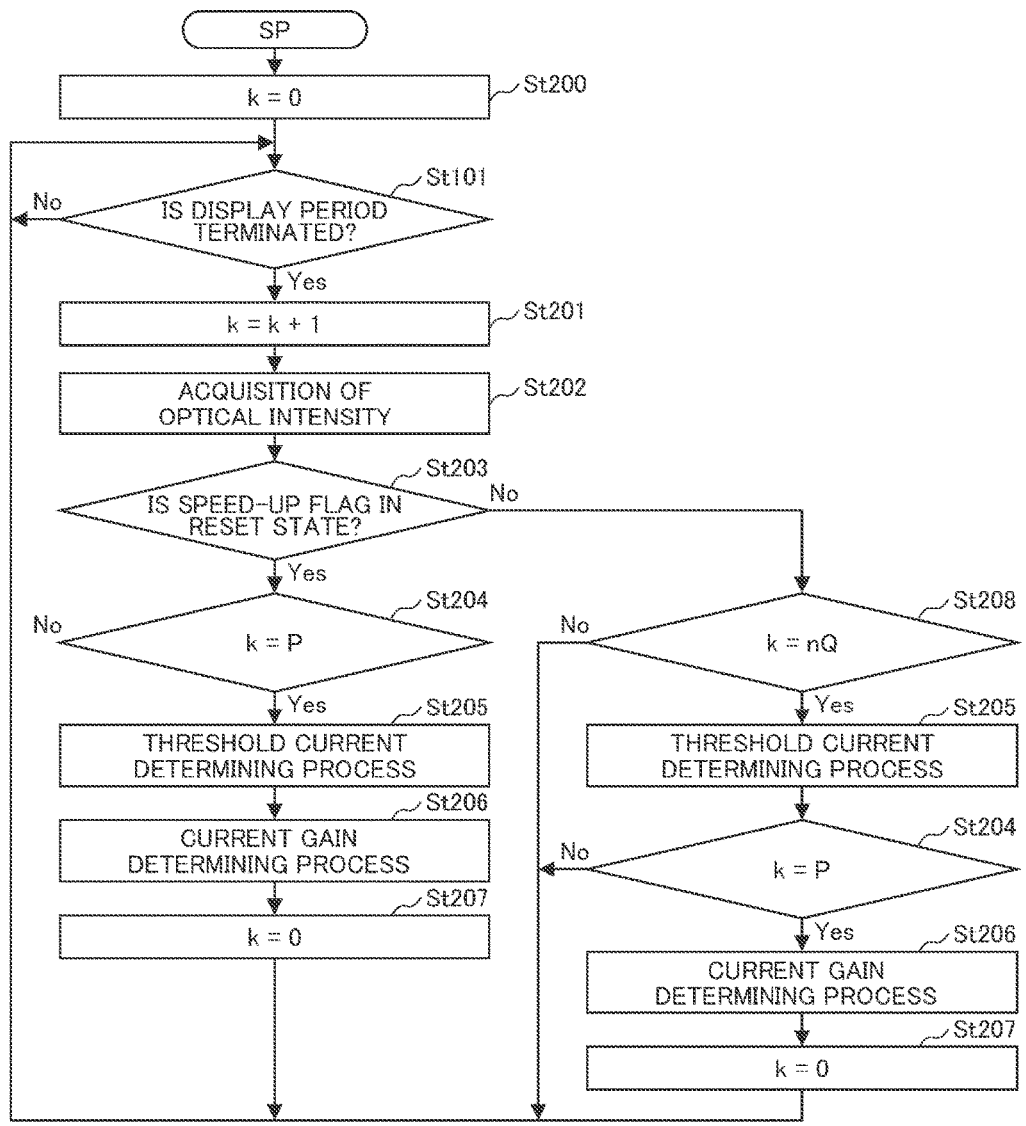
FIG. 8 is a flowchart illustrating APC during a normal operation in Example 1.

The APC in the normal operation will be described with reference to a flowchart in FIG. 8. In FIG. 8, the light-emission control unit 22 resets a variable k after turning on power (St200). The variable k operates as a frame number counter, and operates as a counter that controls an execution cycle of the APC. After resetting the variable k, it is determined whether or not a display period is terminated on the basis of a vertical synchronization signal transmitted from the timing adjusting unit 21 (St101). After the display period is terminated and it enters flyback time, the light-emission control unit 22 increments the variable k (St201). Then, optical intensity of the semiconductor laser is acquired for the threshold current determining process and the current gain determining process (St202). The acquisition of the optical intensity of the laser is performed in the flyback time except for the display period so that the acquisition does not have an effect on the display image. After acquiring the optical intensity, it is determined whether or not the speed-up flag is in a reset state (St203). In a case where the speed-up flag is in the reset state, it transitions to an APC related to St204 to St207 other than immediately after the dimming processing. In a case where the speed-up flag is in a set state, it transitions to an APC related to St208 to St207 immediately after the dimming processing. In the case other than immediately after the dimming processing, the variable k is compared with a predetermined number P of controls of the execution cycle of the APC (St204). In a case where the variable k is not the same as the predetermined number P, it transitions to St101, and in a case where the variable k is the same as the predetermined number P, it transitions to the threshold current determining process (St205). In the threshold current determining process, as described above, a feedback control of a current value, which is set to the threshold current adjusting circuit 25, is performed by using at least P pieces of acquired optical intensity related to St101 to St203. Then, it transitions to a current gain determining process (St206). In the current gain determining process, as described above, a feedback control of a current gain value, which is set to the current gain circuit 24, is performed by using at least P pieces of acquired optical intensity related to St101 to St203. Then, after the variable k is reset (St207), it returns to previous St101 and the above-described process flow is repeated.

As described above, when the speed-up flag is in a reset state, the execution cycle of the threshold current determining process is made to be slow. According to this, the number of acquired samples of the optical intensity increases, and thus a more accurate feedback control becomes possible. In addition, uncomfortable feeling due to a frequent variation in the current control range of the display image is not provided to a user.

Next, description will be given of the APC related to St208 to St207 immediately after dimming processing in which it transitions to a case where the speed-up flag is in a set state. Immediately after the dimming processing, the variable k is compared with the product of a predetermined number Q of controls of the execution cycle of the APC and a natural number n (St208). In a case where the variable k is not the same as nQ, it transitions to St101, and in a case where the variable k is the same as nQ, it transitions to the threshold current determining process (St205). Here, n is set to a natural number of 0, 1, 2, . . . , and the predetermined number Q is a value smaller than the predetermined number P (Q<P). As described above, the threshold current determining process performs a feedback control of the current value that is set to the threshold current adjusting circuit 25 by using at least Q pieces of acquired optical intensity related to St101 to St203. Then, the variable k is compared with the predetermined number P of controls of the execution cycle of the APC (St204). In a case where the variable k is not the same as the predetermined number P, it transitions to St101, and in a case where the variable k is the same as the predetermined number P, it transitions to the current gain determining process (St206). In the current gain determining process, as described above, a feedback control of a current gain value, which is set to the current gain circuit 24, is performed by using at least P pieces of acquired optical intensity related to St101 to St203. Then, after the variable k is reset (St207), it returns to previous St101 and the above-described process flow is repeated.

For example, in a state in which the speed-up flag is set, when P is set to 9, and Q is set to 2, the threshold current determining process is executed at k of 0, 2, 4, 6, and 8. In this manner, when the speed-up flag is set, the threshold current determining process is performed once for every ten frames in a case where the speed-up flag is in a reset state. In contrast, the threshold current determining process is performed once for every two frames immediately after the dimming processing. Accordingly, the execution cycle of the threshold current determining process, which is a feedback control, is shortened immediately after the dimming processing, and it is possible to quickly correct a deviation from ideal characteristics due to the feedforward control. In other words, when referring to FIG. 2, this represents that a setting period of a threshold current value that is set to the threshold current adjusting circuit 25 from the light-emission control unit 22 is short.

As a result, according to this example, it is possible to provide a laser projection display device in which updating of the threshold current determining process immediately after the dimming processing speeds up, and the white balance variation of the display image due to the dimming operation is reduced.

Furthermore, in this example, the execution cycle of only the threshold current determining process immediately after the dimming processing is made to be fast. However, similar to this, it is needless to say that the execution cycle of the current gain determining process may be made to be fast. In this case, in the APC related to St208 to St207 immediately after the dimming processing, when execution procedures of St204 and St206 are substituted with each other, easy execution is possible. In addition, when increasing the number of times of acquiring the optical intensity immediately after the dimming processing, particularly, the acquisition number of the optical intensity that is acquired in one period of flyback time, the number of acquired samples of the optical intensity increases, and thus a more accurate feedback control becomes possible. Accordingly, it is preferable to change the acquisition number of the optical intensity that is acquired in the one period of flyback time in accordance with a set/reset state of the speed-up flag.

Example 2

In Example 1, description has been given of a configuration in which as initiation of the dimming processing, the CPU 12 receives a signal from the illuminance sensor 11 or a control signal from an outer side, generates a dimming request signal for controlling brightness of the display image 13 generated by the image processing unit 2, and supplies the dimming request signal to the image processing unit 2.

In addition to the control method, an image capturing element that captures an ambient image may be provided on an inner side or an outer side of the laser projection display device 1, and the CPU 12 may generate the dimming request signal in correspondence with the image that is captured by the image capturing element. In this case, when using the image capturing element, it is possible to gradually control the brightness of the display image 13 in comparison to the case of using the illuminance sensor 11. For example, description will be given of a case where the laser projection display device is mounted in a vehicle. In a case where a vehicle moves from a load under an environment in which the periphery of the vehicle is bright to a dark environment such as the inside of a tunnel in which the periphery of the vehicle is dark, and the maximum brightness of the display image is set to Lm to Lm/8, the illuminance sensor can detect only brightness of the periphery of the vehicle, and thus it is necessary to rapidly decrease the maximum brightness from Lm to Lm/8. However, in the case of using an image capturing device, it is possible to detect a situation in which the periphery of the vehicle is to be a dark environment such as the inside of a tunnel before several seconds from the dark environment situation due to a captured image. Therefore, it is possible to gradually control brightness of the display image 13 like Lm, Lm/2, Lm/4, and Lm/8. In this configuration, it is possible to decrease the ACL variation amount, and thus it is possible to provide a laser projection display device in which the white balance variation of the display image in the dimming operation is reduced.

Hereinafter, description will be given of a configuration in which the image capturing element is included, and the CPU generates the dimming request signal from the captured image with reference to FIG. 9 as this example. Furthermore, the same reference numeral will be given to a constituent element having the same configuration and same function as in Example 1, and detailed description thereof will not be repeated.

Figure 9:
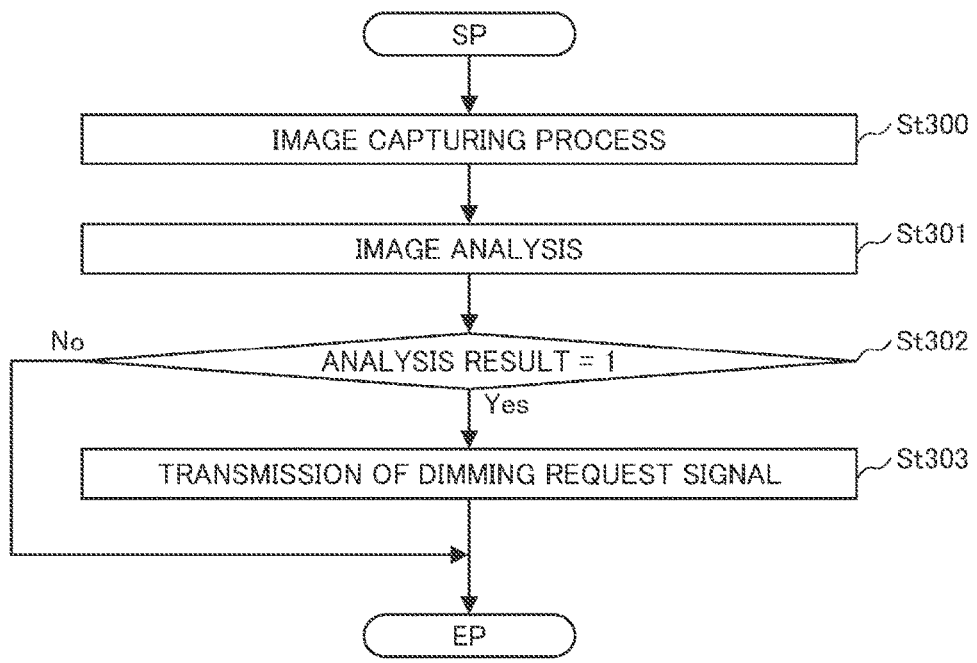
FIG. 9 is a flowchart illustrating processing of a CPU in Example 2.

FIG. 9 is a flowchart illustrating processing of the CPU 12 in this example. In the flowchart in FIG. 9, a flowchart from initiation of an image capturing process to transmission of the dimming request signal is illustrated. Furthermore, for example, it is assumed that initiation of this flowchart is controlled by a timer counter in the CPU 12 and the like, and this flowchart is initiated by the CPU 12 at an arbitrary interval.

In FIG. 9, the CPU 12 transmits a control signal to the image capturing element so as to initiate an image capturing process (St300). The image capturing process represents ambient image capturing by the image capturing element. The image capturing element initiates image capturing by the control signal transmitted from the CPU 12, and transmits a captured image to the CPU 12. The CPU 12 receives the captured image transmitted from the image capturing element, and performs image analysis of the captured image (St301). Here, in the image analysis, it is determined that an ambient environment is to be brighter or darker in comparison to current time after arbitrary time. In a case where the ambient environment is brighter or darker in comparison to current time, "1" is output as an analysis result. In other cases, "0" is output as an analysis result. For example, in a case where a vehicle moves to an environment such as a tunnel in which the periphery of the vehicle is dark, the tunnel is detected by the captured image, and the ambient environment is compared with an environment at current time. According to this, it is possible to determine that it will be darker after arbitrary time. In addition, it is also possible to accurately determine the arbitrary time by using a speed of the vehicle (not illustrated), a GPS signal, and the like. Next, determination is made on whether or not to execute the dimming processing in correspondence with the analysis result (St302). In a case where the analysis result is "1", the number of gradual steps St×t2/t1 is calculated from a relationship between the arbitrary time t1 obtained in the image analysis (St301), the number of steps St up to target brightness, and time t2 necessary to execute the dimming processing, and a dimming request signal is transmitted to gradually change brightness of the display image 13 (St303). In a case where the analysis result is "0", the dimming request signal is not transmitted. For example, when t1 is three seconds, St is three steps, and t2 is one second, the number of gradual steps becomes 1, and a dimming request signal is transmitted so as to make bright or dark the target brightness by one-step brightness. In this manner, it is possible to perform detection before several seconds at which it enters a bright or dark environment by using the image capturing element, and thus it is possible to gradually control the brightness of the display image 13. According to this configuration, it is possible to make the ACL variation amount small, and thus it is possible to provide a laser projection display device in which the white balance variation of the display image in the dimming operation is reduced.

Furthermore, in this example, determination is made on whether or not an ambient environment will be brighter or darker in comparison to current time after arbitrary time by using the captured image, but other configurations may be employed. For example, it is needless to say that determination may be made on whether or not an ambient environment will be brighter or darker in comparison to current time after arbitrary time in conjunction with a car navigation system using a GPS, and a dimming request signal may be transmitted so as to gradually change the brightness of the display image 13.

As described above, according to this example, determination is made on whether or not the ambient environment will be brighter or darker in comparison to current time after arbitrary time, and thus it is possible to transmit the dimming request signal so as to gradually change the brightness of the display image 13. According to this configuration, it is possible to make the ACL variation amount small, and thus it is possible to provide a laser projection display device in which the white balance variation of the display image in the dimming operation is reduced.

Example 3

In Example 1 and Example 2, description has been given of a configuration in which a plurality of colors are simultaneously changed in any dimming. In addition to the control method, a control may be performed to display any one color of RGB after the dimming processing so as to allow a user not to visually recognize a white-balance-varied image with an eye. According to this, it is possible to realize a configuration in which a variation in the amount of light-forward current characteristics of the semiconductor laser due to a rapid variation in the ACL is not visually recognized to a user.

Hereinafter, description will be given of a configuration in which any one color is displayed immediately after the dimming processing as this example with reference to FIG. 10. Furthermore, the same reference numeral will be given to a constituent element having the same configuration and function as in Example 1, and detailed description thereof will not be repeated.

Figure 10:
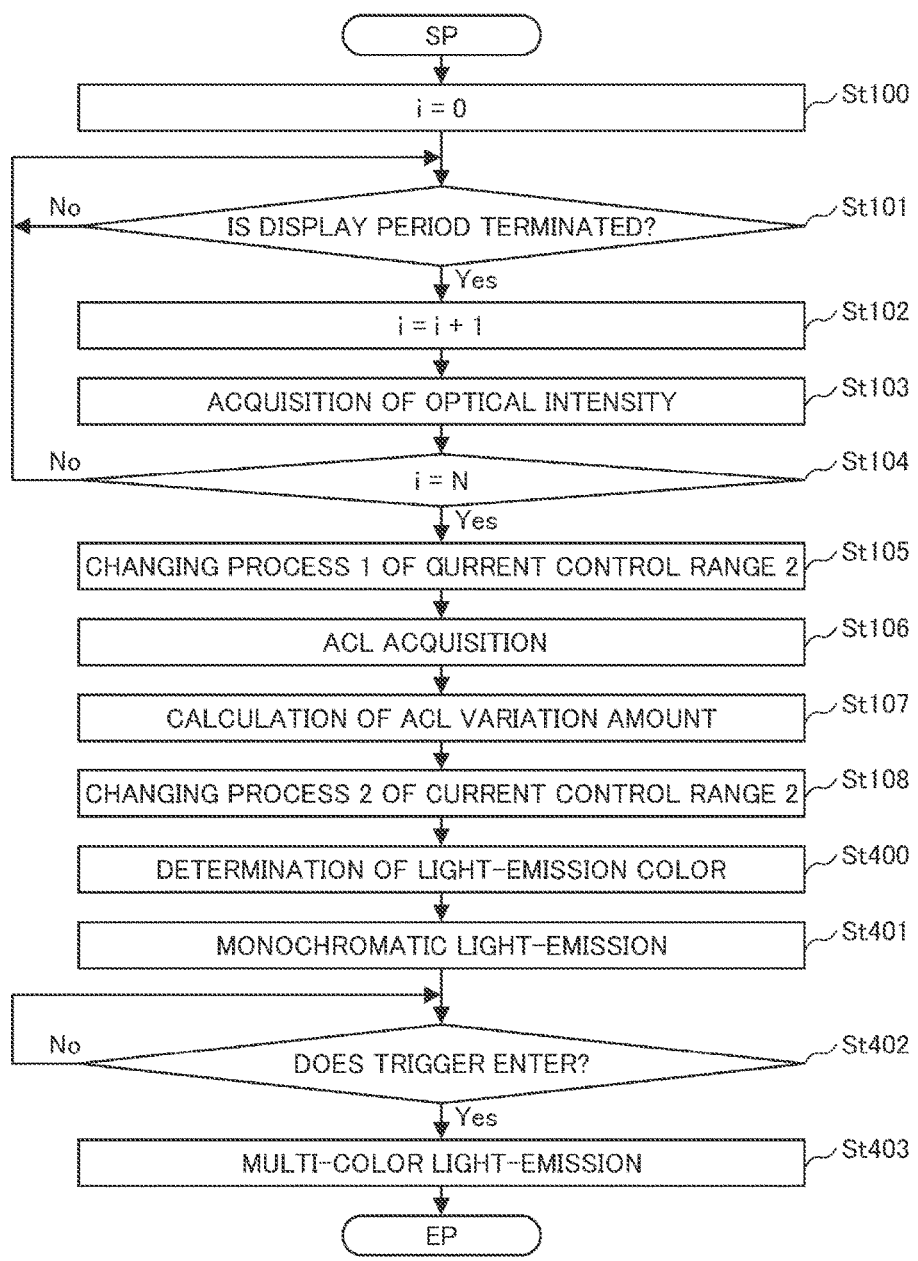
FIG. 10 is a flowchart illustrating processing of a light-emission control unit in Example 3.

FIG. 10 is a flowchart illustrating processing by the light-emission control unit 22 in this example. The flowchart in FIG. 10 represents a flowchart in a case where a dimming request signal is input to the light-emission control unit 22.

In FIG. 10, after receiving the dimming request signal, the light-emission control unit 22 executes processes related to St100 to St108 in the same manner as in Example 1 and FIG. 6. Then, a light-emission color is determined (St400). Here, in determination of the light-emission color, any one color is selected, and the light-emission control unit 22 transmits information of the selected color to the image quality correcting unit 20. The image quality correcting unit 20 makes a change for displaying an input image with only the selected color on the basis of the selected color information that is received from the light-emission control unit 22. Then, so as to display any one color that is determined, the image quality correcting unit 20 provides a value requested in St108 with respect to the color that is selected, and a value with which light-emission does not occur with respect to the other colors to the current gain circuit 24 and the threshold current adjusting circuit 25 (St401). After monochromatic light-emission, the light-emission control unit 22 determines whether or not a trigger enters (St402). In a case where the trigger enters, the light-emission control unit 22 transmits information indicating that a plurality of colors are selected to the image quality correcting unit 20 so as to return to multi-color light-emission, and provides a setting value to the current gain circuit 24 and the threshold current adjusting circuit 25 with respect to the plurality of colors.

Here, the trigger is received in correspondence with a result obtained by executing the timer counter in the CPU 12, or the APC in the normal operation. Particularly, it is preferable to generate the trigger after determining that light-emission intensity of the semiconductor laser is temporarily constant from a result of performing the APC in the normal operation. According to this, when transitioning to the multi-color light-emission, it is possible to provide an image with good white balance to a user.

According to this, it is possible to realize a configuration in which a variation in the amount of light-forward current characteristics of the semiconductor laser due to a rapid variation in the ACL is not visually recognized to a user, and it is possible to provide a laser projection display device in which the white balance variation of the display image in the dimming operation is reduced.

Furthermore, the above description in Examples is made to describe one embodiment of the invention, and is not intended to limit the scope of the invention. Accordingly, it should be understood by those skilled in the art that it is possible to employ embodiments in which each element or the entirety of elements are substituted with equivalent elements, and these embodiments are also included in the scope of the invention. In addition, the above-described examples are described for easy understanding of the invention, and are not limited to include the entirety of configurations which are described. In addition, a part of the configurations in an arbitrary example may be substituted with a configuration of another example, and a configuration of another configuration may be added to a configuration of an arbitrary example. In addition, with respect to a part of configurations of the respective examples, addition, deletion, and substitution of another configuration may be made.

REFERENCE SIGNS LIST

1: Laser projection display device
2: Image processing unit
3: Frame memory
4: Laser driver
5: Laser light source
6: Reflective mirror
7: MEMS scanning mirror
8: MEMS driver
9: Amplifier
10: Optical sensor
11: Illuminance sensor
12: CPU
13: Display image
20: Image correcting unit
21: Timing adjusting unit
22: Light-emission control unit
23: Line memory
24: Current gain circuit
25: Threshold current adjusting circuit
26: Actually flowing current value
27: LUT selection signal
28: Image signal after correction
R1: Amount of light-forward current characteristics of semiconductor laser
T1: Target characteristics

The invention claimed is:

1. A laser projection display device that projects laser light beams of a plurality of colors corresponding to image signals and displays an image corresponding to the image signals, comprising:
   a laser light source that generates the laser light beams of the plurality of colors;
   a laser light source driver configured to modulate the laser light source;
   an optical sensor that detects an amount of light of the laser light beams which are generated by the laser light source; and
   an image processor configured to process the image signals and to supply a plurality of drive signals to the laser light source driver on the basis of the amount of light of the laser light beams detected by the optical sensor, the drive signals including the processed image signals and a threshold current value,
   wherein the image processor is further configured to:
   when the image is displayed with a first luminance, update the threshold current value in a first execution cycle and supply the threshold current value, which is updated in the first execution cycle, to the laser light source driver,
   when changing luminance of the image from the first luminance to a second luminance, update the threshold current value based on an average current level (ACL) of the image and supply the threshold current value to the laser light source driver, and
   for a predetermined period after the luminance of the image is changed from the first luminance to the second luminance, update the threshold current value in a second execution cycle, that is shorter than the first execution cycle, and supply the threshold current value, which is updated in the second execution cycle, to the laser light source driver.

2. The laser projection display device according to claim 1, further comprising:
   an illuminance sensor that detects a brightness at a periphery of the laser projection display device,
   wherein the image processor is further configured to change the luminance of the image that is displayed from the first luminance to the second luminance in accordance with the brightness that is detected by the illuminance sensor.

3. The laser projection display device according to claim 1,
   wherein the image processor is further configured to change the luminance of the image that is displayed from the first luminance to the second luminance in accordance with an instruction of a user of the laser projection display device.

4. The laser projection display device according to claim 1,
   wherein the image processor is further configured to:
   when changing the first luminance to the second luminance, calculate a variation in the ACL of the image between the first luminance and the second luminance, and update the threshold current value based on the variation in the ACL of the image between the first luminance and the second luminance.

5. The laser projection display device according to claim 1,
wherein the image processor is further configured to update and supply the processed image signals in the first execution cycle and the second execution cycle that is shorter than the first execution cycle.

6. The laser projection display device according to claim 1,
wherein the drive signals further include a current gain value, and
the image processor is further configured to update and supply the current gain value with respect to the laser light source driver in the first execution cycle and the second execution cycle that is shorter than the first execution cycle.

7. The laser projection display device according to claim 1, further comprising:
an image capturing element that captures an ambient image of the laser projection display device,
wherein the image processor is further configured to change the luminance of the image from the first luminance to the second luminance through a third luminance based on the ambient light.

8. The laser projection display device according to claim 1,
wherein the image processor is further configured to supply the drive signals to the laser light source driver so that among the lasers of the plurality of colors, any one of the laser light beams is generated when changing the luminance of the image that is displayed from the first luminance to the second luminance.

9. A laser projection display device that projects laser light beams of a plurality of colors corresponding to image signals and displays an image corresponding to the image signals, comprising:
a laser light source that generates the laser light beams of the plurality of colors;
a laser light source driver configured to modulate the laser light source;
an optical sensor that detects an amount of light of the laser light beams which are generated by the laser light source; and
an image processor configured to process the image signals and to supply a plurality of drive signals to the laser light source driver on the basis of the amount of light of the laser light beams detected by the optical sensor, the drive signals including the processed image signals and a current gain value,
wherein the image processor is further configured to:
when the image is displayed with a first luminance, update the current gain value in a first execution cycle and supply the current gain value, which is updated in the first execution cycle, to the laser light source driver,
when changing luminance of the image from the first luminance to a second luminance, update the current gain value based on an average current level (ACL) of the image and supply the current gain value to the laser light source driver, and
for a predetermined period after the luminance of the image is changed from the first luminance to the second luminance, update the current gain value in a second execution cycle, that is shorter than the first execution cycle, and supply the current gain value, which is updated in the second execution cycle, to the laser light source driver.

10. The laser projection display device according to claim 9, further comprising:
an illuminance sensor that detects a brightness at a periphery of the laser projection display device,
wherein the image processor is further configured to change the luminance of the image that is displayed from the first luminance to the second luminance in accordance with the brightness that is detected by the illuminance sensor.

11. The laser projection display device according to claim 9,
wherein the image processor is further configured to change the luminance of the image that is displayed from the first luminance to the second luminance in accordance with an instruction of a user of the laser projection display device.

12. The laser projection display device according to claim 9,
wherein the image processor is further configured to:
when changing the first luminance to the second luminance, calculate a variation in the ACL of the image between the first luminance and the second luminance, and update the current gain value based on the variation in the ACL of the image between the first luminance and the second luminance.

13. The laser projection display device according to claim 9,
wherein the image processor is further configured to update and supply the processed image signals in the first execution cycle and the second execution cycle that is shorter than the first execution cycle.

14. The laser projection display device according to claim 9,
wherein the drive signals further include a threshold current value, and
the image processor is further configured to update and supply the threshold current value with respect to the laser light source driver in the first execution cycle and the second execution cycle that is shorter than the first execution cycle.

15. The laser projection display device according to claim 9, further comprising:
an image capturing element that captures an ambient image of the laser projection display device,
wherein the image processor is further configured to change the luminance of the image from the first luminance to the second luminance through a third luminance based on the ambient light.

16. The laser projection display device according to claim 9,
wherein the image processor is further configured to supply the drive signals to the laser light source driver so that among the lasers of the plurality of colors, any one of the laser light beams is generated when changing the luminance of the image that is displayed from the first luminance to the second luminance.

17. A method for controlling a laser light source driver that modulates a laser light source of a laser projection display device that projects laser light beams of a plurality of colors corresponding to image signals and displays an image, the method comprising:
supplying a plurality of drive signals to the laser light source driver to modulate the laser light source, the drive signals including the processed image signals and at least one current value;
when the image is displayed with a first luminance, updating the at least one current value in a first execution cycle and supply the at least one current value, which is updated in the first execution cycle, to the laser light source driver;

when changing luminance of the image from the first luminance to a second luminance, updating the at least one current value based on an average current level (ACL) of the image and supply the at least one current value to the laser light source driver; and for a predetermined period after the luminance of the image is changed from the first luminance to the second luminance, updating the at least one current value in a second execution cycle, that is shorter than the first execution cycle, and supplying the at least one current value, which is updated in the second execution cycle, to the laser light source driver, wherein the at least one current value includes one of a threshold current value and a current gain value.

18. The method for controlling a laser light source driving unit according to claim 17,
wherein, when changing the first luminance to the second luminance, calculating a variation in the ACL of the image between the first luminance and the second luminance, and updating the at least one current value based on the variation in the ACL of the image between the first luminance and the second luminance.

19. The method of controlling a laser light source driving unit according to claim 17,
wherein the drive signals include the threshold current value, the current gain, and each of the image signals, and
wherein the drive signals are updated and supplied to the laser source driver in the first execution cycle and the second execution cycle that is shorter than the first execution cycle.

* * * * *